United States Patent [19]

Barratt et al.

[11] Patent Number: 4,493,030
[45] Date of Patent: Jan. 8, 1985

[54] PLURAL DATA PROCESSOR GROUPS CONTROLLING A TELECOMMUNICATIONS EXCHANGE

[75] Inventors: Stuart Barratt; Anthony P. Lumb, both of Warwickshire, England

[73] Assignee: The General Electric Company p.l.c., England

[21] Appl. No.: 379,617

[22] Filed: May 19, 1982

[30] Foreign Application Priority Data

May 29, 1981 [GB] United Kingdom ............... 8116449

[51] Int. Cl.³ .................. G06F 15/16; G06F 15/20
[52] U.S. Cl. ........................... 364/200; 179/18 EE
[58] Field of Search ... 364/200 MS File, 900 MS File; 179/18 EE, 18 ES

[56] References Cited

U.S. PATENT DOCUMENTS 4,096,571 6/1978 Vander Mey ................. 364/200
4,099,233 7/1978 Barbagelata et al. .......... 364/200
4,256,926 3/1981 Pitroda et al. ................. 364/200

FOREIGN PATENT DOCUMENTS 2016176 9/1979 United Kingdom.

Primary Examiner—Raulfe B. Zache
Attorney, Agent, or Firm—Kirschstein, Kirschstein, Ottinger & Israel

[57] ABSTRACT

A data processing system having a large number of data processors (1-4) grouped in 'clusters' is used in the control of a telecommunications exchange. The arrangement is such that any one of the processors may pass data to any other of the processors, in its own cluster by way of a synchronous data bus (5), or on other clusters by way of an interface (18, 19) and an asynchronous data bus (22). The arrangement permits larger number of processors (1-4) to have access to storage without undue delay in access to stored data.

10 Claims, 1 Drawing Figure

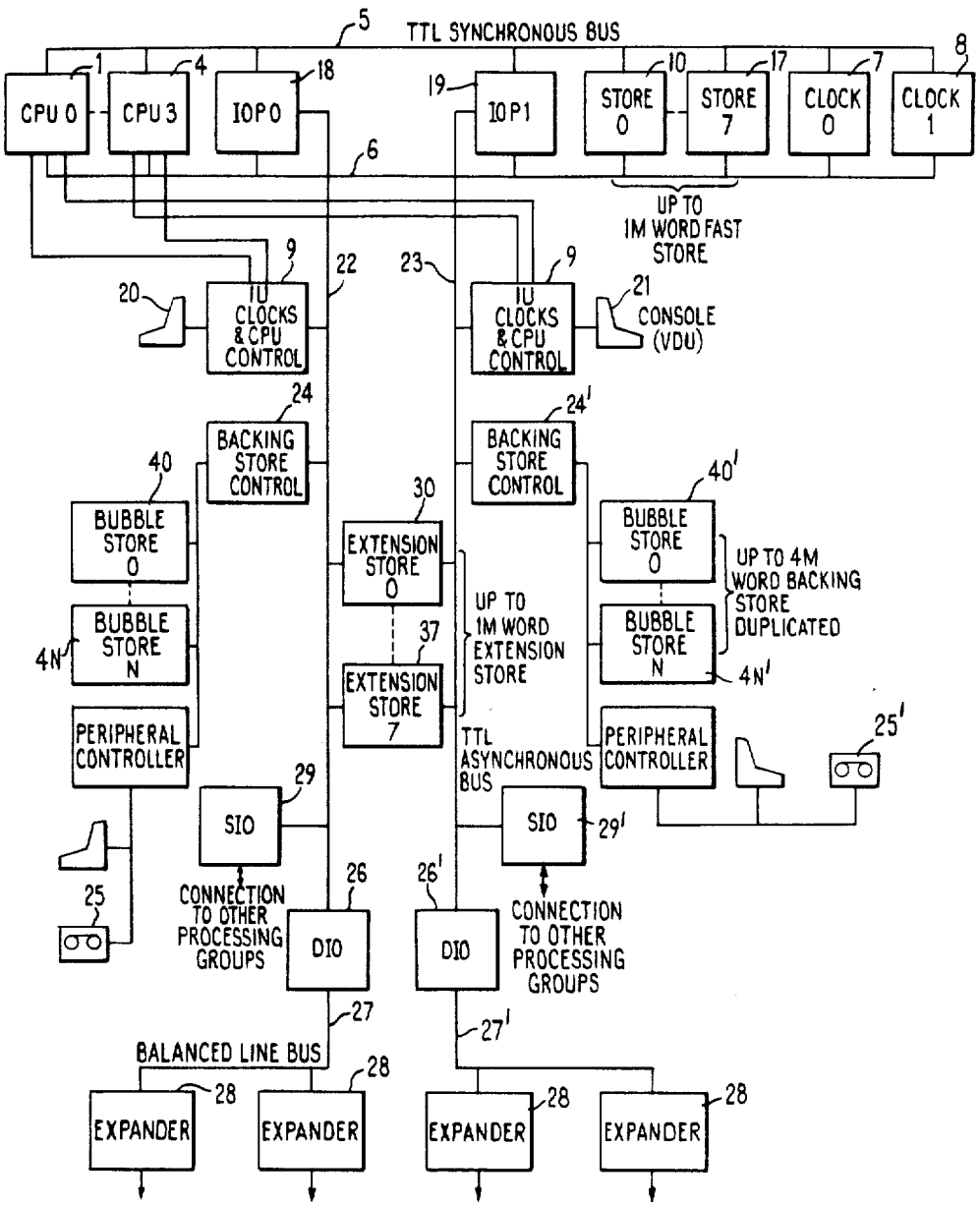

PLURAL DATA PROCESSOR GROUPS CONTROLLING A TELECOMMUNICATIONS EXCHANGE

The present invention relates to data processing arrangements and more particularly to such arrangements for use in controlling telecommunications exchanges.

Computer processing data in situations in which they are required to work in what is known as "real time" may be large and extremely complicated electronic apparatus. They may also require access to a large amount of data held in storage of various kinds and may have a large number of inputs.

As a computer in a particular situation is enlarged to increase its working capability with regard to the number of inputs which it is capable of handling in real time, the period between consideration of a particular input and subsequent consideration of that input may become longer.

Thus in situations where a large data processing capacity is required a number of smaller computers running similar programmes to each other may be provided.

A number of smaller computers running programmes in this manner may be referred to as a "multi-processor" system.

Whilst any one computer in a multi-processor system will have certain fixed data which is unaffected by any other computer in the system it is necessary to provide an interchange between the computers of the system for data which may be processed by the actions of any of the computers and which will affect subsequent processing by any of the computers.

Thus data storage accessible by any of the computers of a multi-processor system may be provided. It will be appreciated that access to data stores is usually possible from only one computer at any instant in time and that each computer requires an input/output interface on each store to which it has access. If a multiprocessor system is further enlarged by addition of further computers, the access interface to common stores must be similarly enlarged and the access time—that is the time taken to read or store data at a particular address of a data store—may become correspondingly longer.

Thus increasing the number of computers in a multi-processor system does not lead to a proportional increase in the real-time processing capability of the system. If a multi-processor system comprises a substantial number of computers there may be no advantage in real time processing capability to be achieved by adding a further computer since the increase in time taken by any of the computers in the multi-processor system to access data held in common storage may be lengthened to the extent that the data processing capability of the additional computer is cancelled out.

It is an object of the present invention to provide a data processing arrangement in which a number of computers working in a multi-processor system have a greater real time data processing capability than the multi-processor hereinbefore discussed.

According to the present invention a data processing arrangement for use in the control of telecommunications exchange apparatus comprises a plurality of data processing groups each having a fast access data store individual to that group, a plurality of data processing units which all have direct access to said store and which are capable of parallel operation on data stored therein, and first input/output means for transferring data signals between the data processing units and exchange apparatus, each of the data processing groups being dedicated to the processing of data originating from a predetermined group of apparatus in a controlled telecommunications exchange and for providing data signals to that group, and each of the data processing groups having respective further input/output means directly connected to the respective further input/output means of each of the other data processing groups in a controlled telecommunications exchange to permit the interchange of data between the data processing groups.

Preferably the direct access between the fast access store and the processing units of a data processing group is by means of a data bus operated in a synchronous signalling mode.

Data transfer between the central processing units and exchange apparatus may be by means of a data bus operating in an asynchronous signalling mode and the first input/output means may be arranged to provide an interface between data signalled on the synchronous data bus and data signalled on the asynchronous data bus.

The further input/output means may be accessible by means of the asynchronous data bus and may be a parallel to serial converter arranged to transmit data provided in parallel on the asynchronous data bus in serial form to the respective further input/output means of the other data processing groups.

A further data store may be provided accessible by means of the asynchronous data bus and a backing store which is preferably a bubble memory store may also be provided.

A data processing arrangement in accordance with the invention will now be described with reference to the accompanying drawing which is a block schematic diagram of one of the groups of data processing units.

Referring to the drawing the data processing group has four central processing units 1–4 each running a respective programme processing data in real-time relating to externally generated telephone exchange signalling, routing and charging information.

Some of the data upon which the respective programmes act is held in a fast access store comprised of eight storage blocks 10–17 each of 128K data words (1K = 1024) each data word having sixteen data bits and six related parity bits which may be used to correct single or double bit errors in the stored data word. Access to the store blocks 10–17 by the central processing units 1–4 is by way of one of two synchronous buses 5 & 6 under control of one of two clocks 7 & 8. When a stored data word is read from one of the data blocks 10–17 a single parity bit is provided relating to the sixteen data bits.

The clocks 7 & 8 each produce corresponding signals at all times and one of the clocks, say 7, controls the data transfer on the buses 5 & 6 whilst the other clock 8 acts in a monitoring capacity. Should the controlling clock 7 fail the other clock 8 automatically takes control of the buses 5 & 6 with a minimum loss of data transfer time on the bus.

The store blocks 10–17 each comprise a quantity of 64K word random-access-memories (RAMs) which require periodical refreshment of the data held therein. The clocks 7 and 8 are arranged to provide a refresh instruction to the data storage blocks 10–17 every 15 micro-seconds to ensure that the data held in the RAMs is not partially or completely modified.

The synchronous buses 5 and 6 provide rapid access by the central processing units 1-4 to the data held in the store blocks 10-17. When one of the central processing units 1-4 requires access by way of the bus the processing unit causes a request signal to pass on to a dedicated line of the synchronous bus 5 or 6 on which access is required. Each of the store blocks 10 to 17 is allocated to one or other of the buses 5 and 6 and is accessible only by way of the allocated bus. The store blocks may be reallocated to the other bus in the event of a bus failure so that the processing power of the four central processing units 1-4 of the group is not completely lost in the event of a single bus failure.

Each data transfer period on the synchronous buses 5 and 6 may conveniently be considered as having two distinct timing sections referred to herein as phase 'A' and phase 'B'. A successful transfer of data from one of the store blocks 10-17 to one of the central processing units 1-4 takes three data transfer periods of the synchronous bus made up as follows:

In phase A of the first data transfer period of the synchronous bus a central processing unit, say, 1 requiring access to a memory, say, store block 10 checks the availability of the store block 10 by comparison of the address on the address lines of the appropriate data bus, say, 5 with the address of the store block 10. If the addresses compare then the central processing unit 1 will be aware that the store block 10 is already being accessed by another unit and will not proceed further until phase A of the next data transfer period when the address comparison is repeated.

Once the store block 10 is free for access the central processing unit 1 arbitrates with other units for access to the bus by causing a signal on its respective request line of the data bus 5. The central processing unit 1 now considers the respective request lines of the data bus 5 of all other units which have access to the bus 5. If the central processing unit 1 has the highest priority, determined as hereinafter described, the access continues in phase A of the next data transfer cycle.

In phase A of the second data transfer cycle the central processing unit 1 forwards a command on command lines of the data bus 5 which indicates the action (read or write) to be taken by the store block 10, the address on which the action is to be taken on address lines of the data bus 5, and the data to be stored (if the command is a write) on data lines of the data bus 5. The central processing unit 1 will also cause a three out of six code indicating its attempt to use the bus on grant verification lines of the data bus 5.

The three out of six code is unique to the central processing unit 1 of the particular group and each unit which has access to the data bus 5 has its own unique three out of six code. Thus if two or more units attempt to access the data bus 5 at the same time four or more signals will appear on the grant verification lines of the data bus and the store block 10 will not attempt to act on the other information received. Should this occur the central processing unit 1 will start the access procedure again in phase 'A' of a subsequent transfer period.

In phase B of the second data transfer period and phase A of the third data transfer period the store block 10 follows the instructions on the command lines of the data bus 5 and (if the command is a read instruction) returns the requested data in phase B of the third data transfer period. In phases A and B of the third data transfer period the store block 10 returns a two-bit code on a response line of the data bus 5 to indicate the success or failure of the data transfer.

Data transfer to and from apparatus and storage external to the processing group is by way of either of two input/output processors 18 and 19. The input/output processors have access to and are accessible from the synchronous buses 5 and 6. If one of the central processing units 1-4 requires to transfer data to or from apparatus external to the processing group it accesses one of the input/output processors 18 and 19 in the same manner as hereinbefore described for access to the storage blocks 10-17. The input/output processor 18 or 19 so accessed responds in a similar manner except that on a read command the addressed input/output processor 18 or 19 returns a two bit code on the response line of the data bus 5 in phases A and B of the third data transfer period without returning any data. The central processing unit 1, 2, 3 or 4 then enters a wait state in which the further bus accesses it may make are restricted until the data is available. When the data is available the input/output processor, say, 18 accesses one of the synchronous buses, say, 5 with the same sequence as described for access by one of the central processing units 1-4. Having obtained access to the synchronous bus 5 the input/output processor 18 forwards a write instruction on the command lines of the bus 5 but does not forward the data in phase 'A' of the second data transfer period (as in a write to store) but forwards the data in phase B of the third data transfer period (as in a central processor unit read from store).

The input/output processors 18 and 19 have access to the storage blocks 10-17 in an identical manner to that described for access by the central processing units 1-4.

Reference has been made hereinbefore to the various lines which make up the synchronous data buses 5 and 6. It is convenient to summarise the sixty-four lines of which each of the buses is comprised and these are as follows:

22 lines for addressing and 1 line for address parity,
16 lines for data and 1 line for data parity,
5 lines for command signals,
11 lines for request signals,
6 lines for grant verification and 1 line each for response, and transfer validation. Phase of data transfer period indication, clock signal, and clock-on-line indication are also provided from the clocks 7 and 8.

The use of the lines with the exception of the clock-on-line indication has been hereinbefore defined. The clock-on-line signal is used to indicate which of the clocks 7 or 8 is controlling transfers on the synchronous buses 5 and 6 in order that all of the units having access to the buses synchronise to the same source.

As previously stated a central processing unit 1-4 or input/output processor 18 or 19 requiring access to one of the synchronous buses 5 or 6 applies a signal on its request line in phase B of the first data transfer period. The 11 lines of the data buses 5 and 6 allocated to request signals are divided as follows: one line for the refresh request signal from the control clock 7 or 8, one line for each of the input/output processors 18 and 19 and one line each for the central processing units 1-4. The remaining four lines are provided to enable additional central processing units (not shown) to be added should the processing power of the group require increasing.

In the arbitration for access to one of the buses 5 and 6 in phase B of the first data transfer period the request signals are analysed by all units attempting access to determine which unit should successfully use the bus for data transfer. The refresh request is the highest priority signal and will always succeed in arbitration for the buses, requests from the input/output processors 18 and 19 have the second order priority whilst requests from the central processing units 1–4 have the lowest priority.

Thus if a refresh request from the controlling clock 7 or 8 is not present one of the input/output processors 18 or 19 will succeed in accessing the bus if it alone requires access. If both of the input/output processors 18 and 19 are attempting to access the same data bus the input/output processor, say, 18 which has a permanent higher priority will succeed.

If neither a refresh request nor a request from either of the input/output processors 18 and 19 is present then a single one of the central processing units 1–4 attempting access to the bus will succeed. If more than one of the central processing units 1–4 is attempting access to the bus the central processing unit(s) which last successfully accessed the bus will fail.

Having considered the processing power centre of the group, consideration will now be given to data transference and use outside of the processing power centre. The input/output processors 18 and 19 are the principle interface between the central processing units 1–4 and all other external apparatus with the exception of control consoles 20 and 21 which have direct access to the central processing units 1–4 for manual control and checking purposes by way of respective interface units 9. The control consoles 20 and 21 may be for example visual display units incorporating a raster display and a manually-operable keyboard.

For access to the external units the input/output processors 18 and 19 use respective asynchronous data buses 22 and 23. Unlike the synchronous bus 5 or 6, the asynchronous bus 22 or 23 must be operated in a manner in which the addressed unit must provide a full acknowledgement to the addressing unit. Accordingly data transfer on one of the asynchronous buses 22 or 23 is slower than that on one of the synchronous buses 5 or 6. However, the arrangement ensures that the maximum use may be made of the processing power of the central processing units 1–4.

Eight extension storage blocks 30–37 are accessible by way of either of the data buses 22 and 23. The data storage blocks 30–37 are of similar capacity (128K words) and construction (64K RAMs) as the data storage blocks 10–17.

*Access may be obtained by way of the asynchronous data buses 22 and 23 to respective backing stores through respective backing store control interfaces 24 and 24'. The backing stores may each comprise for example a number of bubble memory stores 40–4N and 40'–4N', tape storage and disc or drum storage 25, 25'.

Input/output signals from and to hardware modules is provided by a respective parallel interface unit 26, 26' from each of the asynchronous buses 22,23 which supply and receive address and data signals by way of 5 volt balanced lines 27, 27' to the hardware (for example switching units) of the telephone exchange (not shown). Amplification of the signals on the balanced lines 27, 27' may be provided by expander units 28 to allow a larger number of hardware units to be addressed by way of the parallel interface units 26, 26' than would otherwise be possible by direct connection to "TTL" Logic elements.

Respective parallel-to-serial and serial-to-parallel interface units referred to herein as serial input/output interfaces 29, 29' are provided also accessible from the synchronous buses 22, 23.

The serial input/output interfaces 29, 29' provide a data transfer link for connection to other processing groups in the telephone exchange. Each processing group may be similar to the processing group hereinbefore described although to provide for gradual expansion of the data processing power further processing groups may have more or less than four central processing units 1–4. It will be appreciated that other kinds of processing groups may also be arranged to interwork with the described processing group in a similar manner.

The serial input/output interfaces 29, 29' permit access by any central processing unit to data which may be common to the exchange as a whole. Each processing group is still capable of independantly processing data relevant to its particular control responsibility without causing excessive accesses within the data storage areas of other processing groups. Thus the addition of further data processing power within the exchange is possible without significantly affecting the efficiency of the existing data processing power.

As previously stated the asynchronous buses 22, 23 must be operated in a fully acknowledging mode. Accordingly each of the asynchronous buses 22, 23 comprises fifty-six lines defined as follows:

22 lines for addressing and 1 line for address parity,
16 lines for data and 1 line for data parity,
3 lines for command signals,
9 lines for request signals,
2 lines for proceed signals and 1 line each for bus request and bus grant.

The asynchronous bus say 22 is normally controlled by its respective associated input/output processor 18 which transfers data between the synchronous buses 5 and 6 and the asynchronous bus 22. The twenty-two address lines carry data indicative of the location at which the data is to be stored or from which data is to be received. Each hardware unit (not shown) is treated by the data processing arrangements as a store location or group of store locations. Each hardware unit has a unique twenty-two bit address to which it will respond. The various storage units will respond to addresses within an allocated range determined from the most significant bits of the address on the address lines of the bus(es) 22, 23 to which they are respectively connected.

Completion of an access is indicated by the addressed unit by return of a signal on one of the proceed lines of the respective data bus. One of the proceed lines indicates a correct access with the required data (on read), the other line indicating a fault on the access, for example incompatability of the address parity with the address or the data parity with the data.

The bus request and bus grant lines of the two asynchronous buses are used to transfer control of the respective asynchronous bus, say, 23 from the input/output processor 19 to the backing store controller 24'. If for example a large amount of data is to be transferred from one of the bubble memory storage blocks 40' to 4N' to one of the storage blocks 10–17 (or vice-versa) the backing store control 24' causes a signal to be applied to the bus request line of the data bus 23. If no higher priority requirement for the data bus 23 is present (for example from one of the central processing units 1-4 addressing by way of the input/output processor 19) the input/output processor 19 responds by applying a signal on the bus grant line. The backing store control 24' now has direct access to either the serial input/output interface 29' (for transferring data to another processing group) or to send or fetch data from the storage blocks 10-17. The input/output processor 19 monitors the data bus 23 so that if an address relating to a unit on one of the synchronous data buses 5 and 6 is received the input/output processor 19 may make the appropriate access.

We claim:

1. A data processing arrangement for use in the control of telecommunications exchange apparatus comprising
   (A) a plurality of data processing groups
      (i) each having a fast access data store individual to that group,
   (B) a plurality of data processing units,
   (C) a first data bus, all of said data processing units having direct access to said store by way of the first data bus and being of parallel operation on data stored therein,
   (D) a second data bus, and
   (E) first input/output means connected on one side to the first data bus and on the other side to the second data bus for transferring data signals between the data processing units and exchange apparatus,
   (F) each of the data processing groups being dedicated to the processing of data originating from a predetermined group of apparatus in a controlled telecommunications exchange and for providing data signals to apparatus of that group, and
   (G) each of the data processing groups having respective further input/output means which is accessed by way of said second data bus and which is directly connected to the respective further input/output means of each of the other data processing groups in the controlled telecommunications exchange to permit the interchange of data between the data processing groups.

2. A data processing arrangement according to claim 1 wherein the first data bus is operated in synchronous mode.

3. A data processing arrangement according to claim 1 wherein the second data bus is operated in an asynchronous signalling mode.

4. A data processing arrangement according to claim 2 wherein the second data bus is operated in an asynchronous signalling mode and said first input/output means is also arranged to provide an interface between data signalled in the synchronous mode and data signalled in the asynchronous mode.

5. A data processing arrangement according to claim 3, wherein the further input/output means is a parallel to serial converter arranged to convert data provided in parallel on the asynchronous data bus in serial form to the respective input/output means of the other data processing groups.

6. A data processing arrangement as claimed in claim 3, wherein a further data store is provided, said further data store being accessed by means of said asynchronous data bus.

7. A data processing arrangement as claimed in claim 3, wherein a backing data store is provided said backing store being accessed by means of said asynchronous data bus.

8. A data processing arrangement as claimed in claim 7, wherein an interface circuit is provided between said backing store and said asynchronous data bus, said interface circuit being arranged in cooperation with said first input/output means to transfer data from said backing store to other apparatus accessible by said asynchronous data bus without further intervention of said first input/output means.

9. A data processing arrangement as claimed in claim 8, wherein a man/machine interface is provided, said man/machine interface also using said interface circuit for accessing other apparatus accessible by way of said asynchronous data bus.

10. A data processing arrangement as claimed in claim 9 in which said man/machine interface is arranged to access said data processing units by way of the interface circuit, the asynchronous data bus, the first input/output circuit and the synchronous data bus.

* * * * *